(12) United States Patent
Jiang et al.

(10) Patent No.: US 7,365,993 B2
(45) Date of Patent: Apr. 29, 2008

(54) MOUNTING APPARATUS FOR EXPANSION CARD

(75) Inventors: Xiao-Gang Jiang, Shenzhen (CN); Hung-Chun Lu, Tu-Cheng (TW); Wen-Kang Lo, Tu-Cheng (TW); Song Deng, Shenzhen (CN); Chien-Li Tsai, Tu-Cheng (TW)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 136 days.

(21) Appl. No.: 11/343,029

(22) Filed: Jan. 30, 2006

(65) Prior Publication Data

US 2007/0035934 A1 Feb. 15, 2007

(30) Foreign Application Priority Data

Aug. 12, 2005 (CN) .................. 2005 2 0063115 U

(51) Int. Cl.
*H05K 7/12* (2006.01)

(52) U.S. Cl. .............. 361/801; 361/747; 361/759; 361/732; 361/726; 361/740; 312/223.2; 439/160; 439/159

(58) Field of Classification Search .............. 361/801, 361/759, 726, 732, 740, 747; 439/157, 159, 439/160
See application file for complete search history.

(56) References Cited

U.S. PATENT DOCUMENTS

| | | | | |
|---|---|---|---|---|
| 4,990,097 A | * | 2/1991 | Billman et al. | 439/160 |
| 5,429,523 A | * | 7/1995 | Tondreault | 439/157 |
| 5,558,528 A | * | 9/1996 | Cheng et al. | 439/160 |
| 5,730,611 A | * | 3/1998 | Cheng et al. | 439/160 |
| 5,775,925 A | * | 7/1998 | Tondreault | 439/157 |
| 5,846,095 A | * | 12/1998 | Bowen | 439/157 |
| 5,957,708 A | * | 9/1999 | Lin | 439/157 |
| 6,290,519 B1 | * | 9/2001 | Lee | 439/157 |
| 7,233,500 B2 | * | 6/2007 | Yu | 361/737 |
| 7,252,523 B1 | * | 8/2007 | Pennypacker et al. | 439/160 |
| 2005/0152122 A1 | | 7/2005 | Fan et al. | |

* cited by examiner

*Primary Examiner*—Tuan T. Dinh
*Assistant Examiner*—Dameon E Levi
(74) *Attorney, Agent, or Firm*—Morris Manning Martin LLP; Tim Tingkang Xia, Esq.

(57) ABSTRACT

A mounting apparatus for fixing an expansion card (20) in a base (10), the mounting apparatus includes a receiving portion (30), a bracket (40) and a latch (50). The receiving portion (30) is formed from the base (10) for receiving one end of the expansion card (20) therein, and the bracket (40) is formed from the base (10) opposite to the receiving portion (30). The latch (50) is rotatably fixed in the bracket (40). The latch (50) includes a main body (55), a handle portion (52) and a pedestal (51) extending from two end of the main body (55) respectively, and the other end of the expansion card (20) is engaged between the handle portion (52) and the pedestal (51).

19 Claims, 6 Drawing Sheets

MOUNTING APPARATUS FOR EXPANSION CARD

BACKGROUND OF THE INVENTION

1. Field of the Invention

The present invention relates to a mounting apparatus, and particularly to a mounting apparatus for an expansion card.

2. General Background

Typically, an expansion card such as MPEG Audio Layer3 (MP3) card or an additional circuit board are provided in a portable computer for an additional function, and the expansion card or the additional circuit board are connected to a mother board of the portable computer by a wire. However, a plurality of screws is generally provided to mount the expansion card or the additional circuit board in the portable computer, and it will be discommodious and will waste a lot of time to detach and assemble the expansion card or the additional circuit board.

What is desired, therefore, is a mounting apparatus which is able to fix an expansion card in a portable computer conveniently.

SUMMARY

In one preferred embodiment, a mounting apparatus for fixing an expansion card in a base, the mounting apparatus includes a receiving portion, a bracket and a latch. The receiving portion is formed from the base for receiving one end of the expansion card therein, and the bracket is formed from the base opposite to the receiving portion. The latch is rotatablely fixed in the bracket. The latch includes a main body, a handle portion and a pedestal extending from two end of the main body respectively, and the other end of the expansion card is engaged between the handle portion and the pedestal.

Other advantages and novel features will become more apparent from the following detailed description of a preferred embodiment when taken in conjunction with the accompanying drawings, in which:

DETAILED DESCRIPTION OF THE EMBODIMENT

Figure 1:
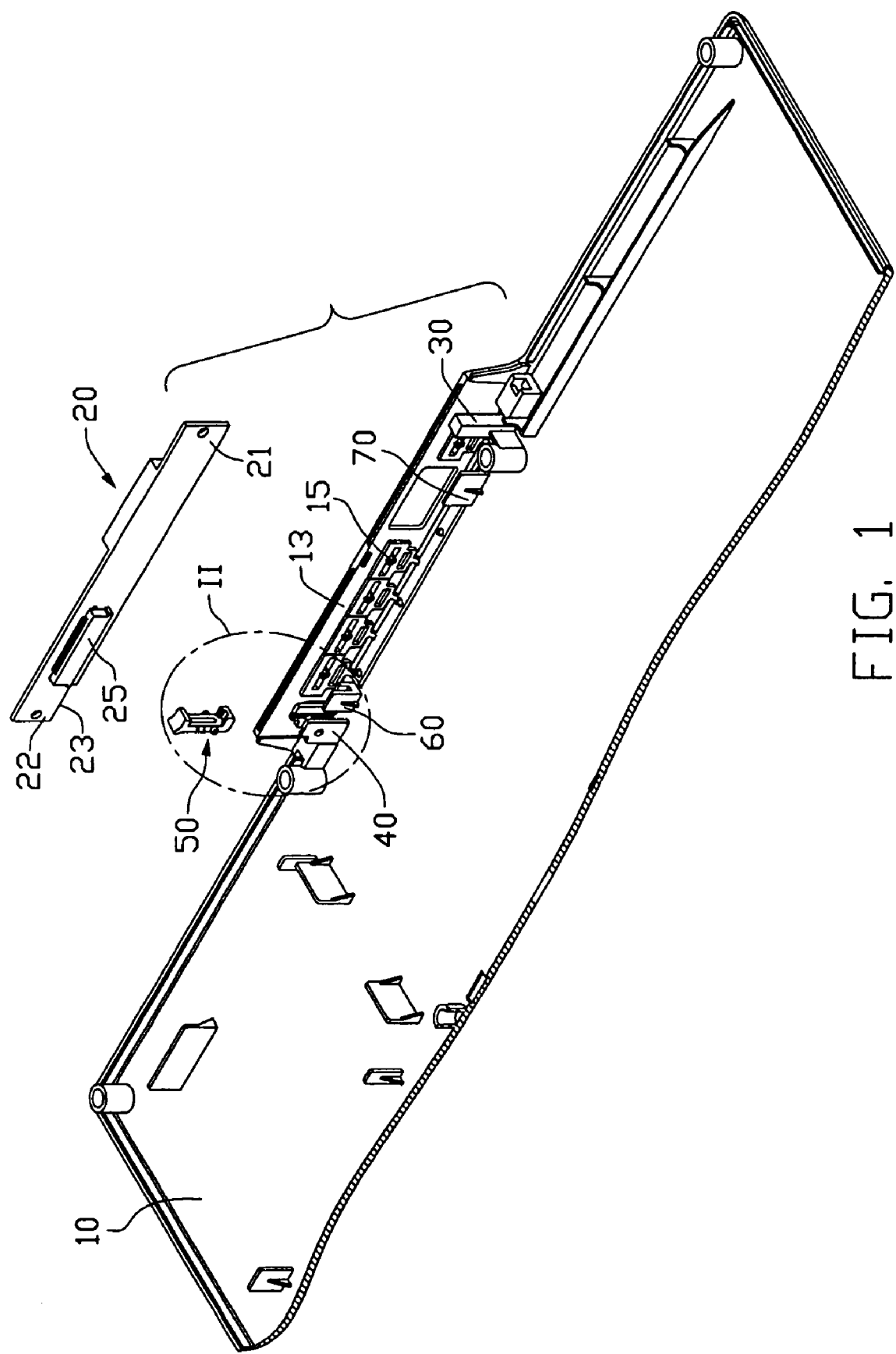
FIG. 1 is an exploded, isometric view of a mounting apparatus in a base and an expansion card in accordance with a preferred embodiment of the present invention.
Figure 2:
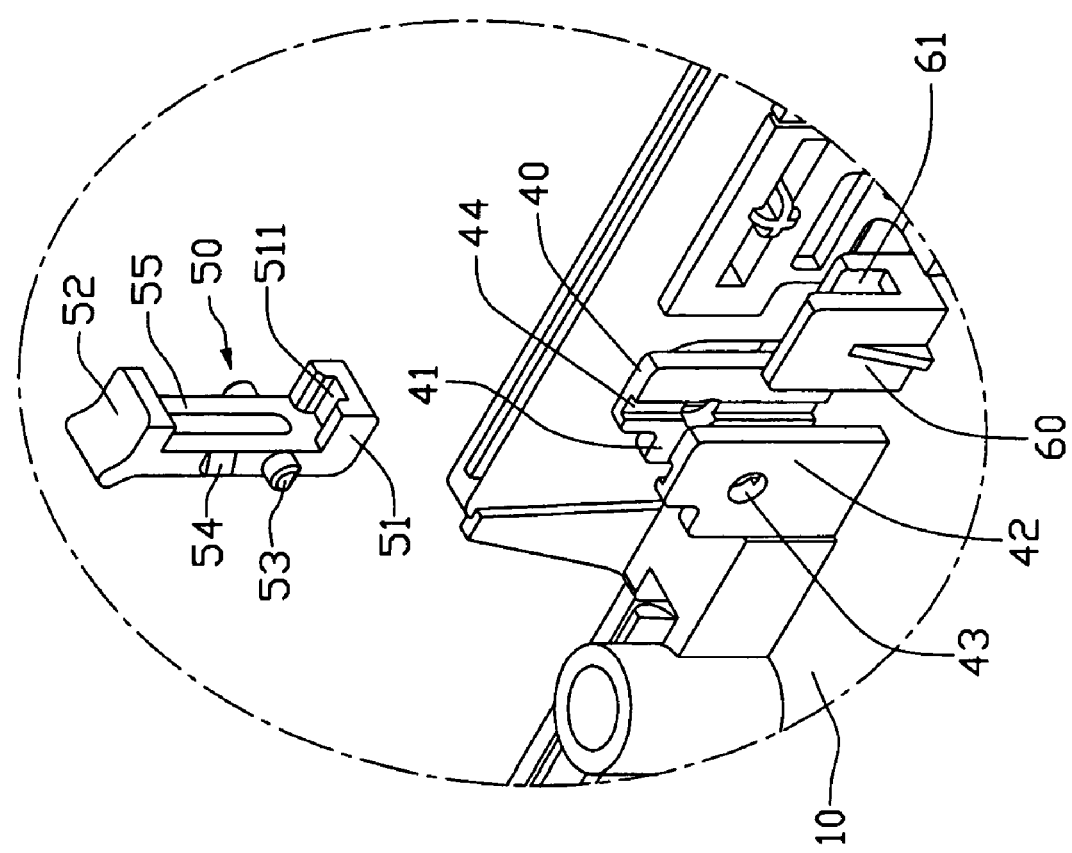
FIG. 2 is an enlarged isometric view of circled portion II of FIG. 1.
Figure 3:
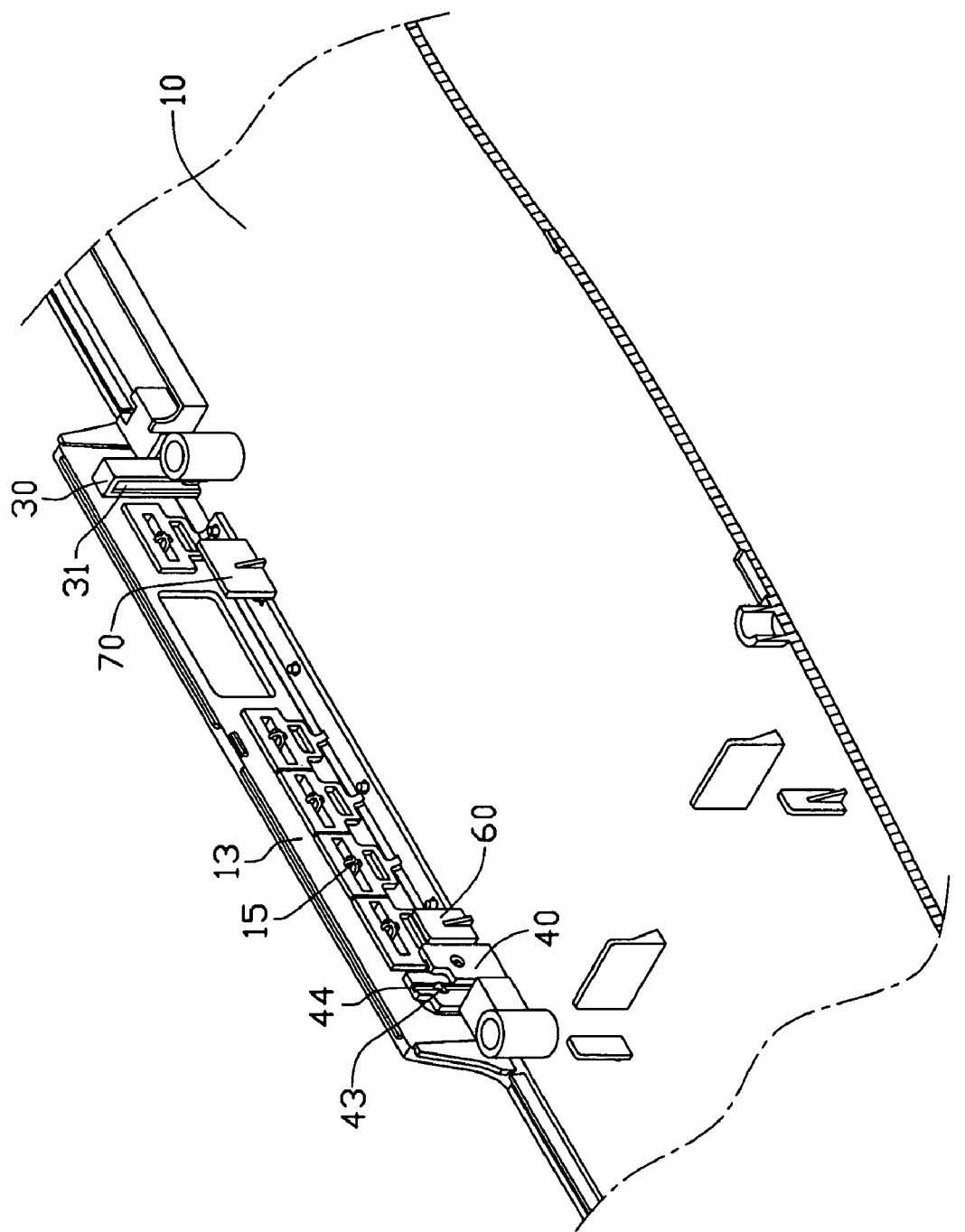
FIG. 3 is similar to FIG. 1, showing the base and a part of components of the mounting apparatus, but enlarged viewed in another aspect.

Referring to FIGS. 1 to 3, a mounting apparatus for an expansion card in accordance with the preferred embodiment of the present invention is adapted for fixing an expansion card 20 to a base 10 of a portable computer. The mounting apparatus includes a receiving portion 30, a bracket 40 and a latch 50.

The base 10 includes a sidewall 13, a plurality of keys 15 is formed from the sidewall 13.

The expansion card 20 includes a first end 21 and a second end 22, and an stepped corner 23 is defined in a bottom of the second end 22. A pair of long sides parallel to each other are defined and extends between the first end 21 and the second end 22. A connector 25 is installed in the expansion card 20. The expansion card 20 is electrically connected to a circuit board through the connector 25 and a wire.

The receiving portion 30 is formed from the base adjacent to the sidewall 13. A receiving recess 31 is defined in the receiving portion 30 for receiving the first end 21 of the expansion card 20 therein.

The bracket 40 is formed adjacent to the sidewall 13 and opposite to the receiving portion 30. The bracket 40 includes two spaced panels 41, 42 parallel with the sidewall 13 respectively. Two engaging slots 44 are defined in opposite sides of the panels 41, 42 respectively, and a hole 43 is defined in each of the panels 41, 42.

The latch 50 includes a main body 55. A pedestal 51 extends from one end of the main body 55, and a handle portion 52 extends from the other end of the main body 55. A groove 511 is defined in the pedestal 51 to engage the stepped corner 23 of the second end 22 of the expansion card 20. The main body 55 includes two sides, and each of the sides of the main body 55 forms a protrusion 53 and a wedge-shaped block 54 corresponding to the holes 43 and the engaging slots 44 of the panels 41, 42.

A fixing portion 60 and a stop plate 70 as a fixing element of the mounting apparatus are formed from the base 10 between the receiving portion 30 and the bracket 40 to protect the expansion card 20 from incline. A slot 61 is defined in the middle of the fixing portion 60 for receiving the expansion card 20 and further fixing the expansion card 20.

Figure 4:
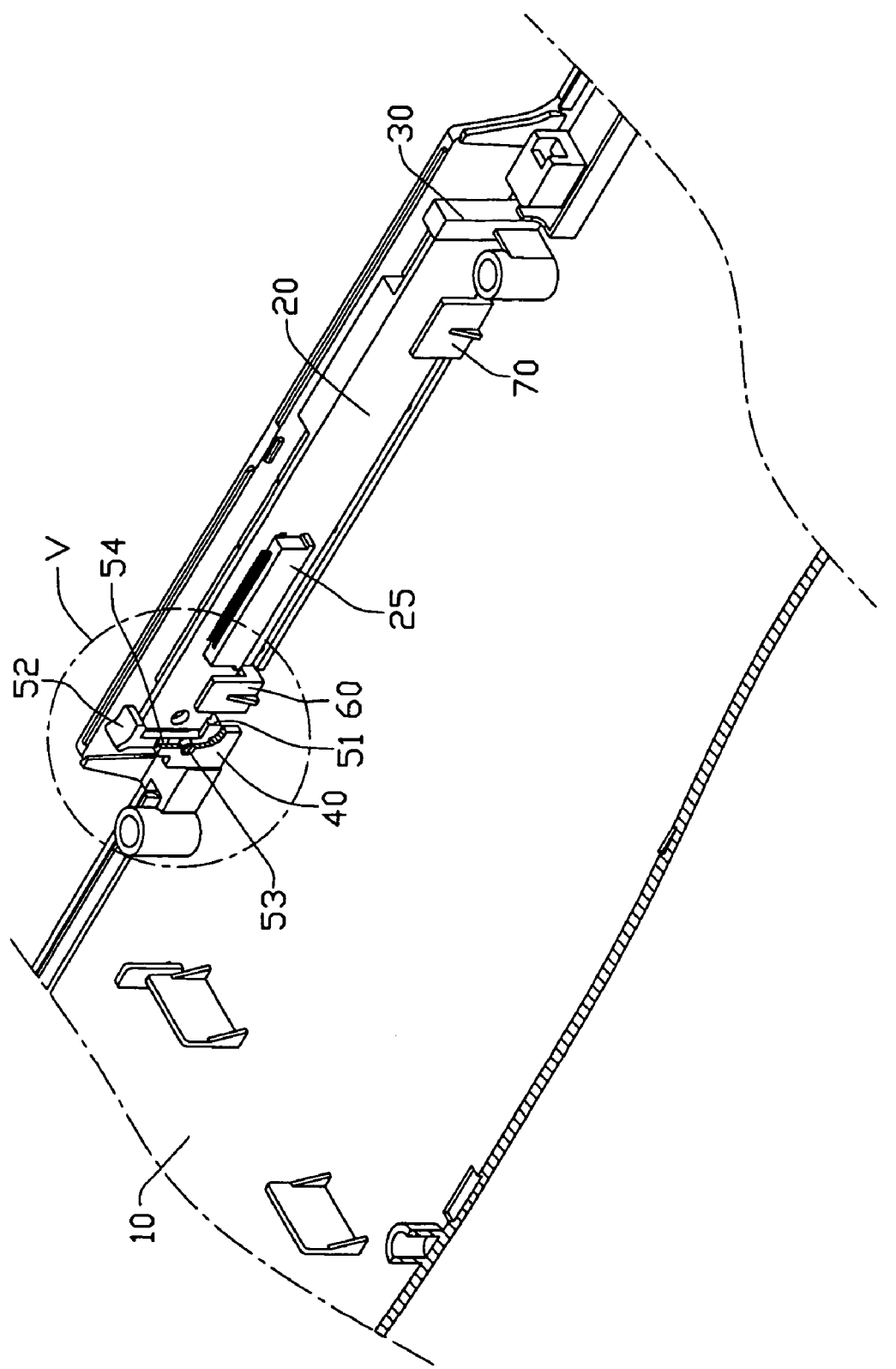
FIG. 4 is an assembled enlarged view of FIG. 1, showing a fixing state of the expansion card, but part sectioned viewed in another aspect.
Figure 5:
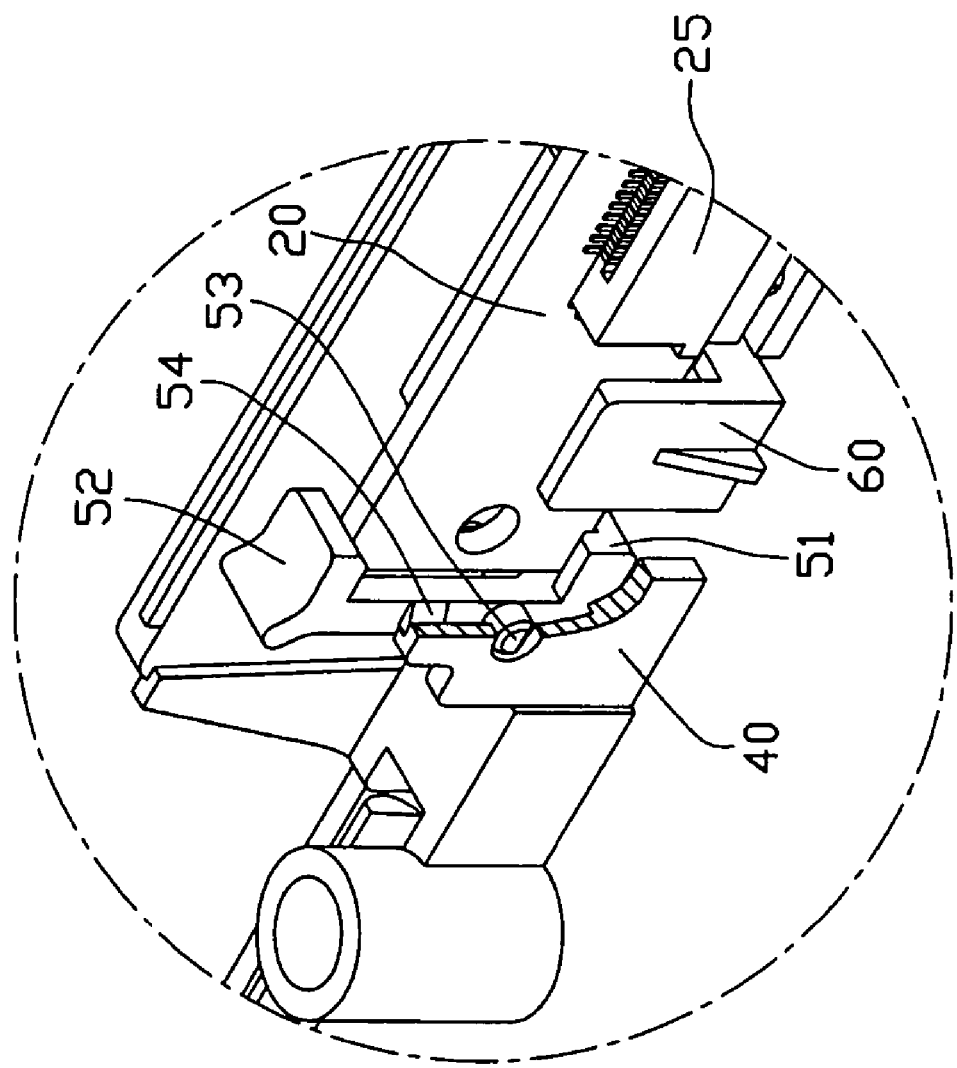
FIG. 5 is an enlarged isometric view of circled portion V of FIG. 4.

Referring also to FIGS. 4 and 5, in assembly, the latch 50 is placed into the bracket 40, with the protrusions 53 of the latch 50 forced into the engaging slots 44 of the panels 41, 42. The latch 50 slides downwardly along the engaging slots 44 until the protrusions 53 of the latch 50 align with the holes 43 of the panels 41, 42, the protrusions 53 snappingly engage in the holes 43, thereby the latch 50 is rotatablely fixed in the bracket 40.

The first end 21 of the expansion card 20 is hold in the receiving recess 31 of the receiving portion 30, and then the second end 22 of the expansion card 20 is engaged with the groove 511 of the pedestal 51 of the latch 50, with the middle of the expansion card 20 received in the slot 61 of the fixing portion 60. Pushing the handle portion 52 of the latch 50 toward the expansion card 20 until the wedge-shaped blocks 54 engage in the engaging slots 44 of the panels 41, 42, the second end 22 of the expansion card 20 is completely engaged between the pedestal 51 and the handle portion 52, and the expansion card 20 is finally fixed. The expansion card 20 is adjacent to the sidewall 13, and the expansion card 20 can be controlled to carry out some task by pressing the keys 15 at the sidewall 13.

Figure 6:
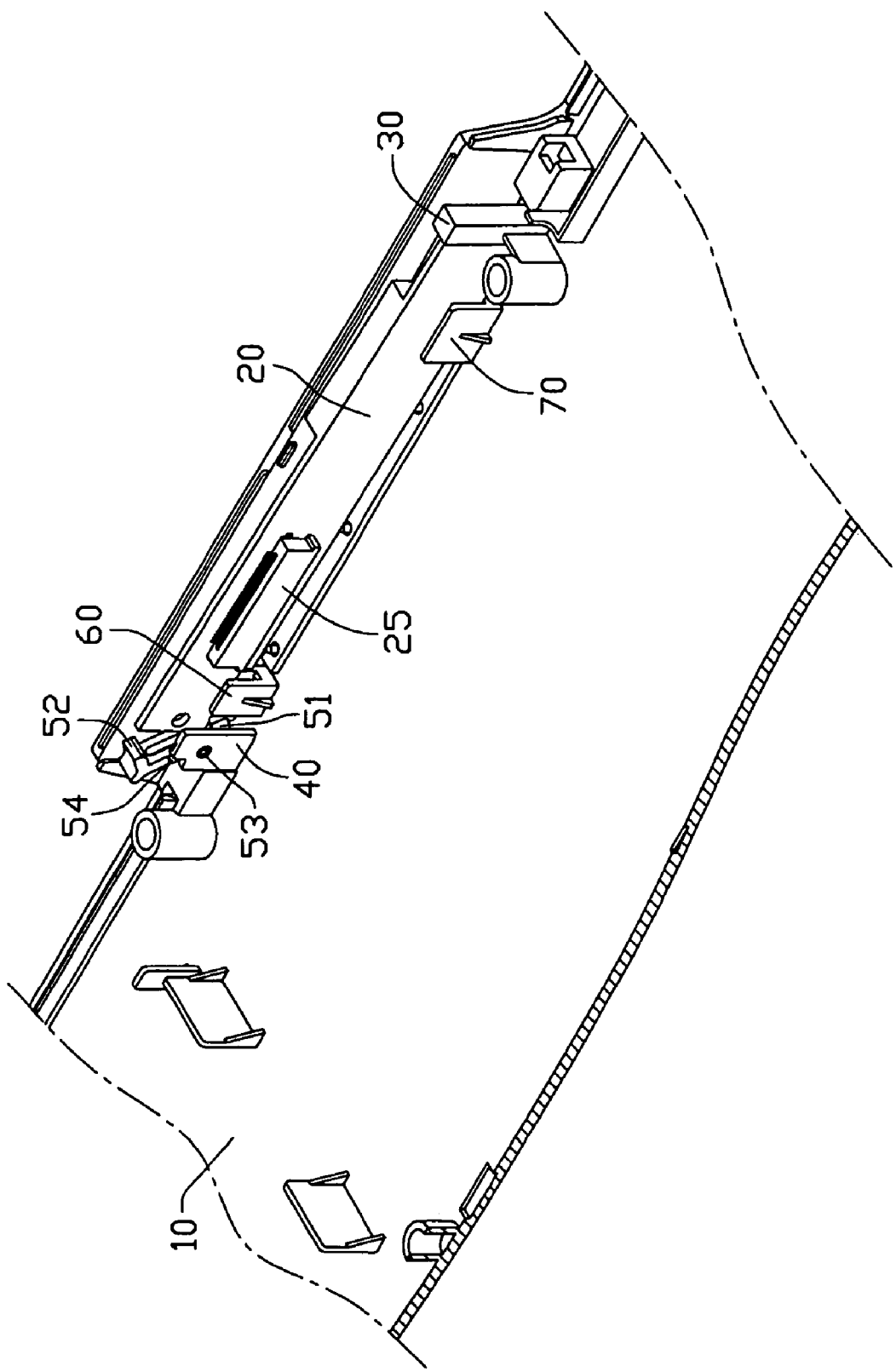
FIG. 6 is an assembled enlarged view of FIG. 1, showing a detaching state of the expansion card, but viewed in another aspect.

Referring to FIG. 6, to detach the expansion card 20 from the base 10, the handle portion 52 of the latch 50 is pulled away from the expansion card 20. The wedge-shaped blocks 54 of the latch 50 are detached from the engaging slots 44 of the panels 41, 42 of the bracket 40. Pulling the handle portion 52 further, the pedestal 51 of the latch 50 is tilted, and the expansion card 20 is jacked up for being easily taken out.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A mounting apparatus for fixing an expansion card in a base, the mounting apparatus comprising:
    a receiving portion formed from the base for receiving one end of the expansion card therein;
    a bracket formed from the base opposite to the receiving portion; and
    a latch rotatablely fixed in the bracket, the latch comprising a main body, a handle portion and a pedestal extending from two end of the main body respectively, and the other end of the expansion card engaged between the handle portion and the pedestal, with the top edge of said other end of the expansion card abutting against and confined by the handle portion, and the bottom portion of said other end of the expansion card abutting against and confined by the pedestal, thereby securing said other end of the expansion card to the bracket.

2. The mounting apparatus as claimed in claim 1, wherein the bracket comprises two spaced parallel panels.

3. The mounting apparatus as claimed in claim 2, wherein two protrusions are formed from two sides of the latch, and a hole is defined in each of the panels to rotatably receive the protrusions of the latch.

4. The mounting apparatus as claimed in claim 2, wherein a wedge-shaped block is formed from one side of the latch, and an engaging slot is defined in an opposite side of one of the panels to engage the wedge-shaped block of the latch.

5. The mounting apparatus as claimed in claim 1, wherein a receiving recess is defined in the receiving portion for receiving said one end of the expansion card therein.

6. The mounting apparatus as claimed in claim 1, wherein a groove is defined in the pedestal for engaging the other end of the expansion card.

7. The mounting apparatus as claimed in claim 1, further comprising a fixing element formed from the base for protecting the expansion card from incline.

8. The mounting apparatus as claimed in claim 7, wherein the fixing element comprises a fixing portion formed between the receiving portion and the bracket, and a slot is defined in the fixing portion for receiving and supporting a lower edge of the expansion card.

9. The mounting apparatus as claimed in claim 8, wherein the fixing element comprises a stop plate formed between the receiving portion and the bracket, and abut against a side surface of the expansion card for preventing the expansion card from incline.

10. A mounting apparatus for fixing an expansion card in a base, the mounting apparatus comprising:
    a bracket formed from the base;
    a latch rotatably fixed in the bracket, the latch comprising a main body and a handle portion extending from the main body such that the top edge of one end of the expansion card is engaged with the handle portion, thereby preventing the expansion card from disengaging from the bracket; and a fixing element formed from the base for protecting the expansion card from incline, wherein a pedestal extends from the main body of the latch and with a groove defined in the pedestal such that said one end of the expansion card is engaged in the groove.

11. The mounting apparatus as claimed in claim 10, wherein the bracket comprises two spaced parallel panels.

12. The mounting apparatus as claimed in claim 11, wherein two protrusions are formed from two sides of the latch, and a hole is defined in each of the panels to rotatably receive the protrusions of the latch.

13. The mounting apparatus as claimed in claim 11, wherein two wedge-shaped blocks are formed from two sides of the latch, and two engaging slots are defined in opposite sides of the panels to engage the wedge-shaped blocks of the latch.

14. The mounting apparatus as claimed in claim 10, further comprising a receiving portion formed from the base opposite to the bracket for receiving the other end of the expansion card therein.

15. The mounting apparatus as claimed in claim 14, wherein a receiving recess is defined in the receiving portion for receiving the other end of the expansion card therein.

16. The mounting apparatus as claimed in claim 14, wherein the fixing element comprises a fixing portion formed between the receiving portion and the bracket, and a slot is defined in the fixing portion for receiving and supporting a lower edge of the expansion card.

17. The mounting apparatus as claimed in claim 14, wherein the fixing element comprises a stop plate formed between the receiving portion and the bracket, and abut against a side surface of the expansion card for preventing the expansion card from incline.

18. An electronic device comprising:
    a base of said electronic device used to carry components of said electronic device including a circuit board, a space defined physically away from said circuit board in said base, said base comprising a sidewall, a plurality of keys installed on said sidewall;
    an expansion card electrically connected with said circuit board via a wire for functional extension of said circuit board, said extension card retainably received in said space of said base adjacent to said sidewall of said base, said expansion card being controlled to carry out tasks when said keys of said sidewall are pressed; and
    a latch movably installed to said base beside said space, said latch abutting against two spaced sides of said extension card to confine movement of said extension card when said extension card stays in said space, and expelling said extension card out of said space by means of urging against one of said two spaced sides of said extension card.

19. The electronic device as claimed in claim 18, wherein at least one fixing element is formed from said base into said space so as to retain said extension card in said space.

* * * * *